Sept. 18, 1956
B. A. SWANSON
2,763,060
FLUID PRESSURE OPERATED RECIPROCATORY VIBRATORY
SHEET MATERIAL CUTTING SHEARS
Filed July 28, 1952
2 Sheets-Sheet 1
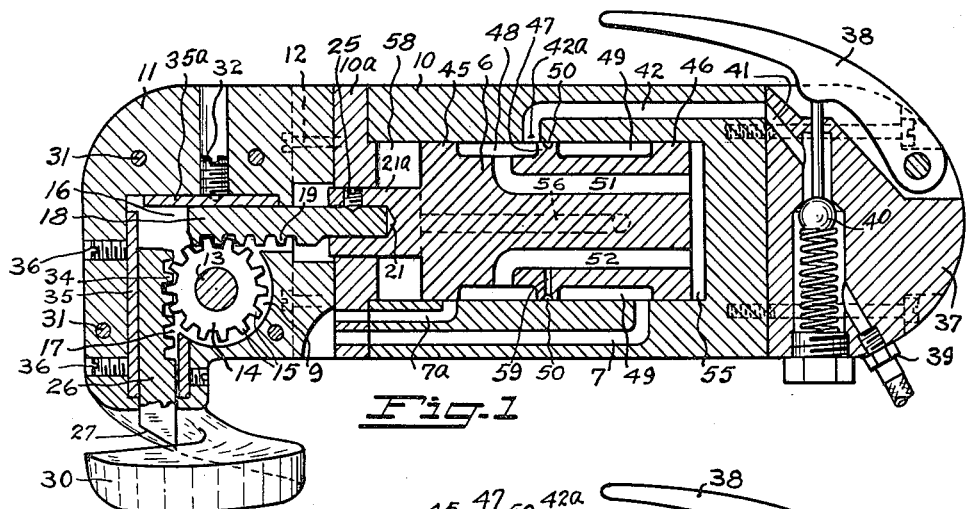
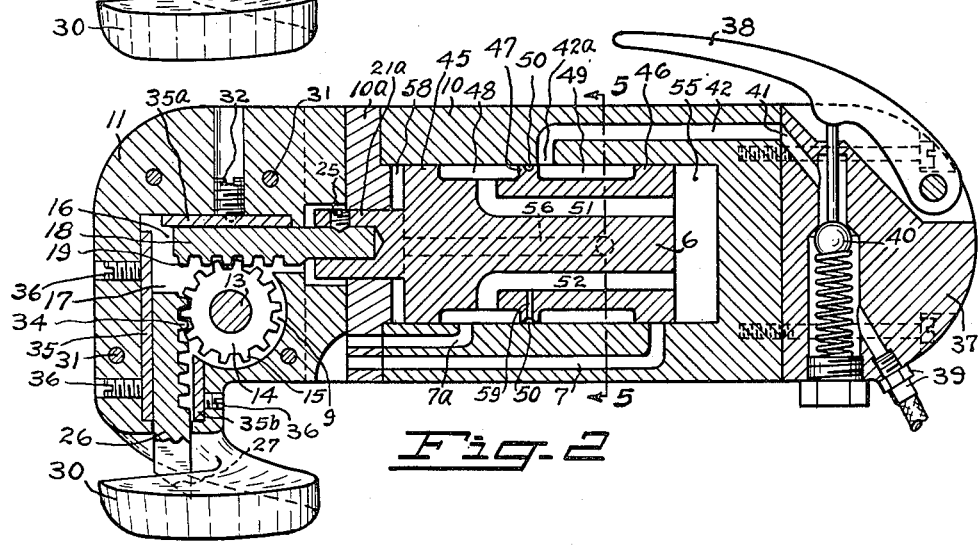
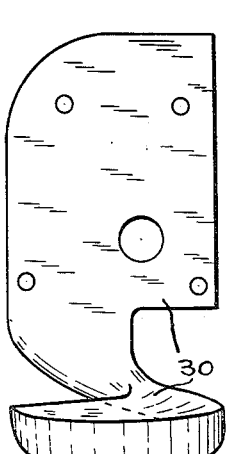
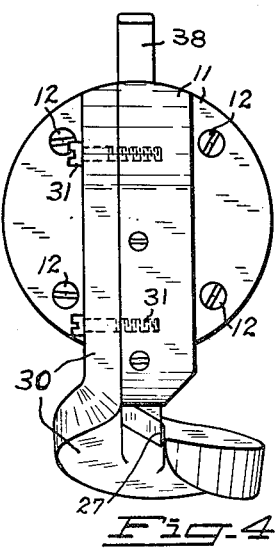
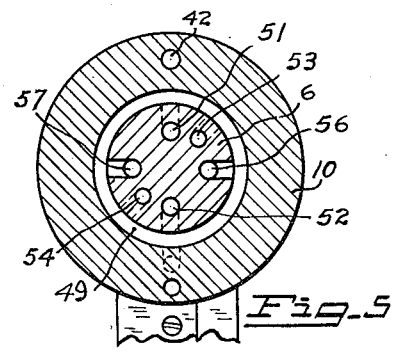
INVENTOR.
Bernard A. Swanson
BY
Wilfred E. Lawson
ATTORNEY

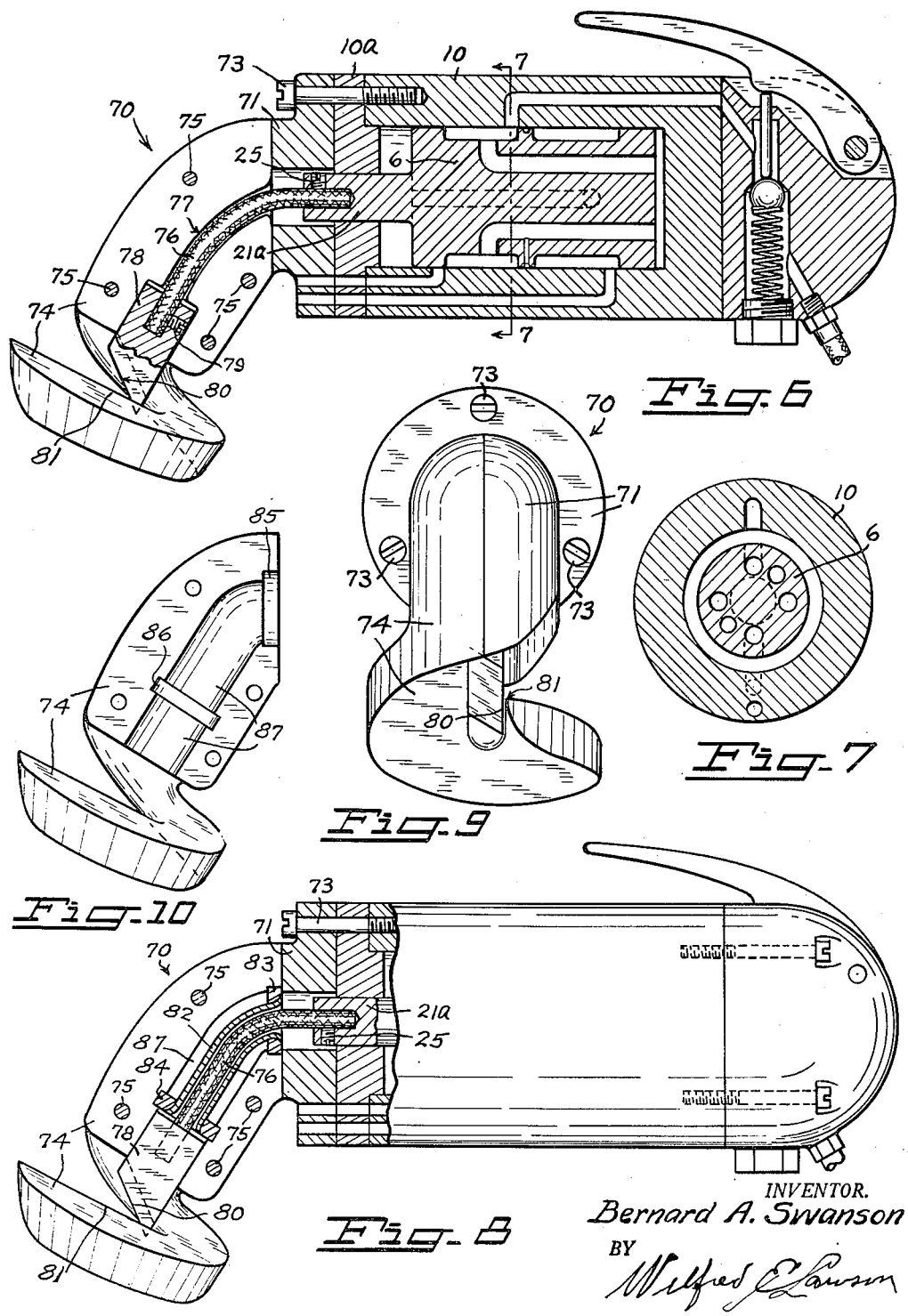

United States Patent Office 2,763,060
Patented Sept. 18, 1956

2,763,060

FLUID PRESSURE OPERATED RECIPROCATORY VIBRATORY SHEET MATERIAL CUTTING SHEARS

Bernard A. Swanson, Sacramento, Calif.

Application July 28, 1952, Serial No. 301,314

7 Claims. (Cl. 30—228)

My invention relates to a fluid pressure operated re-reciprocatory vibratory sheet material cutting shears.

More particularly, my invention relates to a fluid pressure operated reciprocatory vibratory mechanism for cutting sheet material, especially of metallic sheet character. Such a tool is well adapted to meet the problems involved in cutting sheet metal patterns where sharp radii or complicated curves are involved. The tool may also be used as an edge trimmer of sheet or plate metal. Such a device is often referred to as a "nibbler."

This application is a continuation-in-part of my application, Serial No. 97,665, filed June 7, 1949 for Portable Shearing Tool, since abandoned.

So far as known to applicant, after careful and extensive canvassing, there is only one fluid pressure operated shear device on the market and this is of the rotary type. Serious objection obtains to the same due to its relative great weight and its inefficiency as to the volume of fluid pressure medium employed. Also, the said tool is very costly to build so that the price is high. More particularly, however, is the objection that said tool is very expensive as to maintenance due to its complicated and delicate construction. Also, such rotary type of shear is exceedingly bulky for the tasks performed by it and awkward to handle. Such bulkiness is not merely a matter of inconvenience but it is functionally objectionable because it very seriously limits its utility since there are many locations of the sheet of material in assembled devices, as in airplanes, where the working space is limited and which cannot be reached due to the tool size. Bulkiness may render the above tool impossible of use. Where sharp radii are involved special problems are involved. The mere weight of the device imposes a definite limitation for its operation since the operator tires in manipulating the same. This obtains very definitely when the device must be held overhead in operation. Also there is the noise of operation which greatly resembles that of a high pitched siren. This becomes particularly objectionable when working in close quarters as in airplanes and in closed building construction.

There are electric shears on the market but these also are of the rotary type and are even heavier and more bulky and less powerful than the said rotary type of fluid pressure device about which objections are set forth above.

Moreover, a very serious objection to such electric type is the fact that the speed is not readily adapted to be controlled. Likewise, it lacks the feature of a change in length of stroke by its construction, which is a part of my invention. A part of my invention and discovery is that the shearing action should be subject to variation in speed and length of stroke between different devices—all depending upon the type of result desired. For some uses, a substantially balanced power on each end of the reciprocatory piston, and this of short stroke, is advisable according to my discovery. In other uses, a long stroke and unbalanced power, as respects the ends of the piston, function the best.

Furthermore, a very serious objection which obtains to electric tools particularly when used in large scale construction work where extension of electric cables is involved under wet conditions, is the danger of short circuiting with consequent serious and even fatal injury to workmen.

A primary object of my invention is to overcome the objections above set forth. A primary object of my invention is to provide a fluid pressure operated reciprocatory vibratory cutting shear which will be of relatively very light weight (many times less weight than the present tool for comparable operation) and capable of cutting on sharp radii and cutting sheet metal material where the path involves complicated curves.

It is a primary object of my invention to provide such a cutting mechanism that is characterized by its great power per unit weight, quietness of operation, simplicity of construction, and of economical manufacture and at the same time one of great efficiency and of small size so that difficult corners may be reached, and one that is well adapted for working in confined close quarters.

A further primary object of my invention is to provide such a cutting mechanism as will be characterized by its great speed and smooth cutting, that is, the edges cut are left in a smooth condition, having somewhat a polished surface. Furthermore, it is a primary object of my invention to provide such a shear mechanism which will have a head that may be disposed at right angles to the longitudinal axis of the motor cylinder or at various degrees from right angle to zero, that is, to have the head coinciding with the longitudinal axis of the motor cylinder.

A primary object of my invention is to provide such a shear cutting mechanism which operates upon a relatively small volume of fluid pressure medium, the same being only a fraction of that required for the rotary device to which objection is set forth above. I have discovered a method and have invented a vibratory mechanism which, in contrast to any rotary vibratory device, is far more efficient and affords a construction which provides the above objects and purposes herein set forth in detail. A device of such reciprocatory character is peculiarly simple in construction and therefore economical in manufacture and in maintenance, and one which requires only a fraction of the volume of fluid pressure as does the said rotary type existing tool to which objection is set forth above.

The above mentioned general objects of my invention, together with others inherent in the same, are attained by the mechanism illustrated in the following drawings, throughout which like reference numerals indicate like parts:

Figure 1 is a view in longitudinal section of a device embodying my invention with a piston at one extreme position;

Fig. 2 is a view in longitudinal section of the same with the piston in the other extreme position;

Fig. 3 is a separate view in elevation of the anvil member of plate form of my invention;

Fig. 4 is a front end elevatonal view of the pneumatic shears;

Fig. 5 is a view in cross section taken on line 5—5 of Fig. 2;

Fig. 6 is a view in longitudinal section of a modified form of my invention showing the head disposed at about thirty degrees with a flexible cable drive;

Fig. 7 is a view in cross section on dotted line 7—7 of Fig. 6;

Fig. 8 is a view of the same partly in elevation and partly in section but with the head having a replaceable tubular flexible cable sleeve mounting for the flexible connector;

Fig. 9 is a front view in perspective of the cutting head of the modifications of Figs. 6 and 8; and Fig. 10 is a view in side elevation of the head of the modification of Fig. 8 with the replaceable tubular flexible cable sleeve removed.

Referring to the form of the device shown in Figs. 1 to 5 of the drawings, a cylinder 10 of a fluid pressure motor has an end plate 10a closing one end thereof. A head 11 is secured to the cylinder 10 by a plurality of securing elements, as bolts 12 passing through said end plate 10a. The head portion 11 is provided with a cutout 9 and rotatably supports therein a shaft 13, one end being mounted in said head portion 11 and the other end in an anvil 30, on which a gear 14 is mounted having a plurality of spaced teeth 15. A pair of right angularly related slots 16 and 17 is disposed in the head 11 for the assembly of parts therein. A rack member 18 is slidably positioned in the slot 16 and the rack 18 is provided with teeth 19 which mesh with the gear teeth 15. The rearwardly projecting end of the rack member 18 is positioned in a socket 21 which is formed in one end portion of extension 21a of piston 6 of the fluid pressure operated reciprocating engine having cylinder 10. The operation of said engine results in the piston 6 moving back and forth in the cylinder 10. The rack member 18 may be maintained in the socket 21 of the extension 21a of piston 6 by means of a set screw 25. Slidably arranged in the other slot 17 is a movable cutting member 26 which has one end bevelled to define a sharp cutting edge 27. The cutting member 26 is mounted for movement toward and away from the lower underlying portion of anvil 30, the said anvil being secured to the exterior of the head portion 11 by bolts 31.

The movable cutting member 26 is provided with a plurality of teeth 34 which mesh with the gear teeth 15, and arranged on one side of the cutting member 26 is a thrust plate 35. The rack member 18 is also in sliding engagement with the thrust plate 35a which is engaged by an adjusting screw 32. Thrust plate 35b, held by adjusting screw 36, is disposed below gear 15. A plurality of adjusting screws or bolts 36 project through the head portion and into engagement with the thrust plate 35 so that the latter can be adjusted as wear requires.

The cylinder 10 has secured thereto an end cap 37 which has pivotally mounted thereon a trigger 38 and the end cap includes a fitting 39 which is adapted to be connected to a hose which conveys fluid medium under pressure, such as compressed air from a source of supply. The incoming air passes from said fitting to a ball check valve 40 which may be manually controlled by said pivotally mounted trigger 38. The compressed air passes through conduit 41 in cap 37, thence through conduit 42 and into the engine by way of valley 48 or 49 or groove 50 depending upon the position of piston 6.

The piston 6 has hill-lugs 45 and 46, respectively, at each end of the piston 6 and a third hill-lug 47 intermediate said end hill-lugs 45 and 46 with lateral valleys 48 and 49 on each side of said third hill-lug 47. Said third hill-lug is provided with a fluid pressure inlet starting groove 50. Connecting inlet conduits 51, 52, 53 and 54 communicatively connect lateral valley 48 with the end portion 55 of cylinder 10 (see Figs. 2 and 5). Inlet conduits 56 and 57 shown in solid line in Fig. 5 (inlet conduit 56 being also shown in dotted lines in Figs. 1 and 2) communicatively connect lateral valley 49 with the end portion 58 of cylinder 10. A seepage starting conduit 59 extends from groove 50 to conduit 52 whereby fluid pressure may be caused to enter conduit 52 and build up pressure in end portion 55 of cylinder 10 whereby the piston may be caused to move whenever the said piston stops at dead center with groove 50 communicating with inlet conduit 42.

Suitable exhaust conduits 7 and 7a are arranged to discharge through end plate 10a.

With the piston 6 in position as in Fig. 1, the fluid pressure enters valley 48 from inlet conduit 42. Thence, it passes into conduits 51, 52, 53 and 54, which communicate with the annular valley 48, and the fluid pressure passes to the space 55 in the cylinder 10 at the rear end of the piston 6, thereby building up pressure therein and driving the piston to the opposite end, as appears in Fig. 2. Thereupon, inlet conduit 42 communicates through port 42a with valley 49 so that fluid pressure passes through conduits 56 and 57 to the space 58. Then, the piston 6 is reversed and the cycle is repeated. The exhaust, with the piston 6 in position as in Fig. 1, is through conduit 7, which communicates with valley 49, which in said position is then in communication through conduits 56 and 57 with the space 58, permitting the air to pass back to valley 49, thence out exhaust conduit 7. The fluid exhaust, with the piston 6 in the position shown in Fig. 2, is through conduit 7a which communicates with valley 48, which in said position is then in communication through conduits 51 and 52 with space 55.

In Figs. 6 to 10 modified and preferred forms of my invention are shown, particularly as relates to an angularly disposed head 70 formed of two members, longitudinally registering, each being substantially one-half. One-half is a body member 71 secured to the plate 10a and to cylinder 10 by screws 73. The other substantially one-half is an anvil member 74 secured to the body member 71 by screws 75.

Since the fluid pressure motor parts are identical in the forms of my invention shown in Figs. 6 to 10, inclusive, to those shown in Figs. 1 to 5, inclusive, the said parts are not renumbered.

One end of a flexible connector or cable 76 in guide channel 77 is secured in extension 21a of piston 6 by a set screw 25 and the other end is secured to a knife member 78 provided with bevel edge 80 by set screw 79, and edge 80 is disposed to cooperate with anvil edge 81 as a shear cutting means, as shown in Figs. 6 and 9. In Fig. 9, the anvil edge 81 is drawn spaced enough to show separation from knife or bevel edge 80, but these are really contacting in actual construction.

In the modified form of the angularly disposed head shown in Figs. 8 and 10, provision is made for a replaceable running or guide sleeve 82 having collars 83 and 84 disposed respectively in recesses 85 and 86. The replaceable sleeve 82 is disposed in bore-like recess 87 which arrangement provides for economical machining and construction since the head 70 forming members (body 71 and anvil 74) are open along their longitudinal midsection. Connecor 76 and guide sleeve 82, by the construction presented in Figs. 8 and 10, may be readily and economically replaced as they become worn from extended use.

Such flexible connector or cable 76 provides an economical means of angularly connecting the piston extension 21a to the knife 78 in order that the reciprocatory movement of the piston 6 may be thereby communicated to the knife 78. The replaceable sleeve 82 insures a ready means for overcoming the problem of replacement after failure from wear due to the movement of the flexible connector or cable 76 after extensive use.

The angular disposition of the head 70 as respects the longitudinal axis of cylinder 10 renders the device more adaptable in maneuvering and guiding the device along lines of sharp and complex curves. In short, such arrangement facilitates the operator to move the device to reach work in places where otherwise it would be very difficult to do so, if not impossible.

Mode of operation

Much of the mode of operation of both forms of my invention, that is, the form set forth in Figs. 1 to 5, inclusive, and the forms set forth in Figs. 6 to 10, inclusive, is disclosed in connection with the description above of the construction of the devices embodying my invention. In operation, a suitable source of supply of air or other fluid medium is connected to the cylinder 10 and is employed in reciprocating the piston 6 as explained above. This reciprocatory movement moves the rack member 18 back and forth, which rotates the gear 14. This causes the cutting member 26 to reciprocate in moving toward and away from the anvil 30 so that a work piece can be readily sheared or cut by the coacting cutting member 26 and anvil 30. For other uses, as planing, chiseling, engraving, tooling, filing, and jig sawing, obviously corresponding mounting heads would be substituted for the head illustrated.

The mode of operation of the forms shown in Figs. 6 to 10, inclusive, has been given in large measure along with the description of the construction of the same. These forms are of very economical construction so far as machining and assembling is concerned.

The outstanding problem in shearing mechanism of the character disclosed herein relates to the providing of an anvil of a form which will permit the moving of the device both in a straight line cutting and also in a cutting involving complex curves and curves of sharp radii. In achieving this result, I have discovered that the same may be accomplished by a means of a spirally shaped anvil 30 in Figs. 1 to 5, inclusive, and anvil 74 in Figs. 6 to 10, inclusive. Such shape provides for positioning the anvil in alignment with the cutting blade and also provides for the material after being cut to not interfere with the continuing of the cutting even when on a sharp curve. The feature of having a short stroke, and this in rapid succession, provides for efficiently following the curved line in cutting even those characterized by sharp radii because the cutting does not involve an extended cut but is one of such minuteness that there is no difficulty in turning the device in following the curve. By having these vibrations or strokes of high speed, the cutting is rendered substantially of a continuous character. Such character of cutting enables precision in operation and avoids false cutting. I have discovered that the fluid pressure reciprocatory movement is exceedingly efficient in providing power for such cutting mechanism. This results in providing a simplicity of construction and a lightness of weight which renders the device most economical in construction and also most readily maneuverable by the operator as it provides for lightness of weight. The operator does not soon become tired in handling a device of this character, which is a plurality of times less in weight than that of the rotary type commonly in use.

The discovery is also a part of my invention that the direct reciprocatory drive on the cutting blade gives a much more direct power to the cutter in contrast with the rotary driving power. In such rotary operation, the action seems to be more of a pushing than a direct drive. Even by greatly increasing the speed of a rotary drive, the action is still of a pushing character.

We now come to an outstanding and most important feature in the mode of operation of my invention.

In the above disclosure as respects the fluid pressure operated motor comprised of piston 6 and cylinder 10, reference was made to the power or effectiveness characterizing my invention. According to my invention or discovery, such effectiveness is greatly changed by changing the speed of the piston 6 and the length of the stroke of the same. These in turn are subject to control by the porting provided. For example, if greater effectiveness is desired, then the number of conduits, such as 51, may be increased in order to supply fluid pressure faster to one end of the cylinder, and likewise the number of such ports 56 extending to the opposite end may be increased to secure a balanced operation, i. e., to provide a length of stroke of piston 6 the same in each direction from inlet port 42a. If an unbalanced operation is desired, then the number of such conduits as respects one end may be provided without substantial regard to the opposite end. It will be noted that the extension 21a cuts down the head area of piston 6 in the space 58 so that in order to provide a balanced operation of the piston 6 it does not require as many conduits 56 as are required for the opposite end, such as conduits 51, where the area of the piston 6 disposed in the space 55 is not reduced by any such extension member 21a. Accordingly, more air is required to fill space 55 to equal space 58 in total pressure. In all this, of course, the size of the ports and of the conduits diametrically considered are assumed to be the same, and it is assumed in the above that the piston travel is balanced, i. e., the length of stroke and rate of movement in each direction is the same and the amount of fluid total pressure at each end of the piston stroke is the same. In order to provide control of reciprocatory motion of the piston 6 when a balanced fluid pressure condition is provided, increased speed can be attained by narrowing the hill-lug 47, to provide communication between inlet port 42a and valley 48 or valley 49 a relatively greater portion of the piston reciprocation period, and of course to slow down the device said width of the hill-lug 47 would be increased, to provide communication between inlet port 42a and valley 48 or valley 49 a relatively smaller portion of the reciprocation period. Also, variation of the speed of the piston may be obtained by unbalancing the said unit area pressure on the end of the piston or keeping the balanced condition and changing the size of the conduits, a reduction in conduit size resulting in a reduced speed and an increase in conduit size resulting in an increased speed in the direction away from the cylinder head area in communication with such conduits.

An unexpected result of the high speed operation is that the shearing edge of the cutting tool when employed in the device of my invention does not appear to lose its fine sharp cutting edge even after extended hours of use in cutting many kinds of material, including stainless steel of various degrees of hardness and various types of dural aluminum, known to the trade as S. T. 75 and S. T. 24.

I claim:

1. In a power operated shearing tool; a hollow cylindrical casing having a solid head portion at one end, said head having a laterally disposed slot opening through the side thereof and an axially disposed slot connecting the inner end of the first slot with the interior of the hollow portion of the casing, said head also having a cutout opening into said slots at the angle formed by the connected ends thereof; a shaft passing diametrically through the head and through the cut outout; a spur gear carried by that portion of the shaft within the cutout and having its toothed periphery projecting into the slots; a rack bar slidably supported in the axially disposed slot and having its teeth meshed with the teeth of the gear; a second bar slidable in the laterally disposed slot and provided with teeth along one of its sides meshed with the teeth of the gear; a cutting element carried at the outer end of the second bar; a bracket mounted on the head in underlying relation with respect to the outer end of the laterally disposed slot; a cutting element carried by the bracket for cooperation with the first cutting element; and power operated means for imparting reciprocating motion to the rack bar, which motion is transmitted to the second bar by oscillating motion imparted to the gear by the rack bar.

2. The invention as defined in claim 1, with the said bracket of relatively narrow elongated form and secured at one end to the head at one side of the outer end of the laterally disposed slot, the other end thereof being spaced from the adjacent side of the head and supporting the second named cutting element in line with the first cutting element.

3. A fluid pressure operated reciprocatory vibratory sheet metal cutting shear mechanism, comprising a fluid pressure motor having a cylinder; a reciprocatory hill-and-valley piston mounted therein; a head rigidly secured to one end wall of said cylinder, said head being partially longitudinally divided into substantially two halves, one half being a mounting member and the other half being a cutting anvil carried by said mounting member; a cutting blade mounted in the outer end portion of said head in operative position with respect to said anvil; and reciprocating movement transmitting means connecting said blade and said piston.

4. A fluid pressure operated reciprocatory vibratory sheet metal cutting shear mechanism, comprising a fluid pressure motor having a cylinder; a reciprocatory hill-and-valley piston mounted therein, said piston having an extension on one end extending through the end wall of said cylinder; a head rigidly secured to said one end wall of said cylinder, said head being longitudinally divided into substantially two halves, one half being a mounting member and the other half being a cutting anvil; a cutting blade mounted in the outer end portion of said head in operative position with respect to said anvil; and a reciprocating movement transmitting connecting means longitudinally slidable in said head and extending between said blade and said extension of said piston.

5. A fluid pressure operated reciprocatory vibratory sheet metal cutting shear mechanism, comprising a fluid pressure motor having a cylinder; a reciprocatory hill-and-valley piston mounted therein; a head rigidly secured to one end wall of said cylinder, said head being longitudinally divided into substantially two halves, one half being a mounting member and the other half being a cutting anvil; a cutting blade mounted in the outer end of said head in operative position with respect to said anvil; and flexible reciprocating movement transmitting means of longitudinally fixed dimension connected between said piston and said blade transmitting reciprocatory movement of said piston to said blade.

6. A fluid pressure operated reciprocatory vibratory sheet metal cutting shear mechanism, comprising a fluid pressure motor having a cylinder; a reciprocatory hill-and-valley piston mounted therein; a head rigidly secured to one end wall of said cylinder, said head being longitudinally divided into substantially two halves, one half being a mounting member and the other half being a cutting anvil; a cutting blade mounted in the outer end portion of said head in operative position with respect to said anvil; a replaceable tubular flexible cable sleeve mounted in said head; and flexible reciprocating movement transmitting cable means extending in said cable sleeve between said blade and said piston.

7. A fluid pressure operated reciprocatory vibratory sheet metal cutting shear mechanism, comprising a fluid pressure motor having a cylinder; a reciprocatory hill-and-valley piston mounted therein; a head rigidly secured to one end wall of said cylinder, said head having its longitudinal axis disposed at an angle to the longitudinal axis of said motor, said head being longitudinally divided into substantially two halves, one half being a mounting member and the other half being a cutting anvil; a cutting blade mounted in the outer end portion of said head in operative position with respect to said anvil; and flexible, longitudinally inextensible, reciprocating movement transmitting cable means directly connected between said blade and said piston, said cable means effectively transferring high speed reciprocatory vibrations from said piston to said blade through a curved path corresponding to the angle of disposition of the longitudinal axis of said head with respect to the longitudinal axis of said motor.

References Cited in the file of this patent

UNITED STATES PATENTS

| | | |
|---|---|---|
| 1,759,842 | Fossa | May 27, 1930 |
| 1,922,846 | Gray | Aug. 15, 1933 |
| 2,224,708 | Van Sittert | Dec. 10, 1940 |
| 2,272,295 | Forss | Feb. 10, 1942 |
| 2,482,582 | Grafe | Sept. 20, 1949 |
| 2,488,224 | Mothorn | Nov. 15, 1949 |